UNITED STATES PATENT OFFICE.

THERESA M. SUSEMIHL, OF BUFFALO, NEW YORK, ASSIGNOR TO NATIONAL ANILINE & CHEMICAL COMPANY, INC., OF NEW YORK, N. Y., A CORPORATION OF NEW YORK.

DISAZO DYE.

1,378,388.   Specification of Letters Patent.   Patented May 17, 1921.

No Drawing.   Application filed July 14, 1920. Serial No. 396,124.

*To all whom it may concern:*

Be it known that I, THERESA M. SUSEMIHL, a citizen of the United States, residing at Buffalo, in the county of Erie, State of New York, have invented certain new and useful Improvements in Disazo Dyes; and I do hereby declare the following to be a full, clear, and exact description of the invention, such as will enable others skilled in the art to which it appertains to make and use the same.

The present invention relates to a new disazo dye which is of value for dyeing silk, cotton, wool and other fibers, and as a union dye for fabrics composed of various mixtures of these fibers. The invention includes also the dyed fabrics, or other material, dyed with the new dyestuff.

The new dyestuff can be obtained by the diazotization of p-amino-acetanilid, or of p-nitranilin, coupling the diazo compound so obtained with meta-amino-p-cresol-methyl ether, diazotizing the intermediate monazo compound thus produced and coupling the same with 2.5-aminonaphthol-7-sulfonic acid (I acid), and then saponifying off the acetyl group, or reducing the nitro group, all as more fully hereinafter set forth. The new dyestuff in the form of its sodium salt has the following probable formula:—

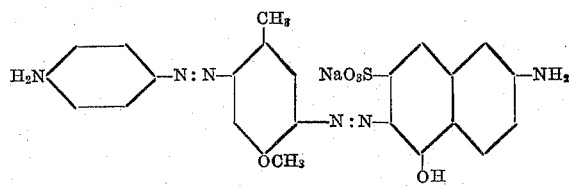

The following specific examples will further illustrate the invention, the parts being by weight.

Example 1: 7.5 parts of p-amino-acetanilid are dissolved in 300 parts of hot water, the solution cooled with ice and 14.5 parts of hydrochloric acid of sp. gr. 1.19 added. The resulting cold solution is then diazotized in the usual manner with 3.5 parts of sodium nitrite.

6.8 parts of m-amino-p-cresol-methyl-ether are dissolved in 200 parts warm water containing 5 parts of hydrochloric acid of sp. gr. 1.19, the solution cooled to 0° C., and the cooled solution of diazotized p-amino-acetanilid, produced as described above, is poured in to it. A ten per cent. aqueous solution of soda ash is then slowly added, with good agitation, until the mixture reacts alkaline to brilliant yellow test paper. The dye formation begins at once, and upon continued stirring and addition of soda, the dye is obtained in a yellow crystalline state. The monazo compound thus produced is filtered off and washed, and then stirred up at ordinary temperature with about 3000 parts of water to which 24 parts of hydrochloric acid of sp. gr. 1.19 has been added. This converts the monazo compound into the crystalline hydrochlorid. The solution is cooled to 0° C., and an aqueous solution of 3.5 parts of sodium nitrite added, and the whole stirred for a period of about 1 to 1½ hours, or until the crystalline hydrochlorid is in solution as a soluble diazo compound.

The solution of the diazotized intermediate thus produced is then slowly added, with good agitation, to a cold solution of 12 parts of 2-amino-5-naphthol-7-sulfonic acid (I acid) in 200 parts of water containing 2 parts of caustic soda and 30 parts of soda ash, or containing about 35 parts of soda ash (and no caustic soda). During the process of the addition of the diazo compound, the solution should be tested from time to time with brilliant yellow test paper to insure that it does not become acid, and more soda ash is added if necessary to prevent this. After stirring over night to complete the coupling, the solution is heated with steam to the boiling point, common salt is added to near saturation, with resulting separation of the dyestuff, and the solution is filtered off from the precipitated dye.

The disazo dyestuff thus produced is then subjected to saponification by heating the precipitated dye for a period of about 5 hours at a temperature of 90–100° C. with 500 parts of ten per cent. caustic soda solution. The acetyl group is thereby replaced by hydrogen to give the amino group. The solution is then diluted with an equal volume of water and neutralized with hydrochloric acid to the point at which it gives only a faint alkaline reaction with brilliant yellow test paper. The dye is filtered off from the hot solution; it may be further purified by redissolving in hot water, salting out with common salt, and again filtering.

Example 2: 6.9 parts of p-nitranilin are dissolved in 6.8 parts of boiling hydrochloric acid of sp. gr. 1.19 which has been diluted with 20 parts of water, and the boiling solution thus obtained is then poured into 9.6 parts of hydrochloric acid of sp. gr. 1.19 containing sufficient ice to keep the temperature at or near 0° C. This method of procedure gives a suspension well adapted for diazotization.

To the cold suspension, produced as above described, there is added all at once an aqueous solution of 3½ parts of sodium nitrite. Equivalent quantities of other nitrites, such, for example, as potassium nitrite, etc., may be used. After the addition of the sodium nitrite solution, and after the solution has been permitted to stand for a few minutes, air is blown through the solution until any excess of nitrous acid is completely expelled, the temperature being kept at or near 0° C. by the addition of ice or other cooling means.

6.9 parts of m-amino-p-cresol-methyl-ether are dissolved in 200 parts of warm water containing 5 parts of hydrochloric acid of sp. gr. 1.19, the resulting solution is cooled to 0° C., and is then poured into the cold diazotized p-nitranilin solution, produced as above described, and the resulting mixture stirred until coupling is complete. To the solution thus produced, which contains the monazo dye in suspension, there is now added a concentrated aqueous solution of 4 parts of sodium nitrite, and the solution is stirred at a temperature of 0° C. for a period of about 12 hours, or until the insoluble monazo dye is completely dissolved as a diazo compound, thereby producing the diazotized intermediate for the subsequent coupling operation.

12 parts of 2-amino-5-naphthol-7-sulfonic acid (I acid) are dissolved in 75 parts of water containing 2 parts of caustic soda and 30 parts of soda ash, or containing about 35 parts of soda ash (and no caustic soda), and to this cooled solution there is slowly added the secondary diazo solution, produced as above described, the temperature being kept below 10° C. and the mixture well agitated until the coupling is complete. During the coupling operation the solution should be tested from time to time with brilliant yellow test paper to insure that it does not become acid, and if necessary more soda ash must be added to prevent this. When the coupling is complete, the solution is heated, with stirring, to 70 to 80° C., common salt is added to saturation, and the agitation is continued for a period of about 12 hours during which time the solution is allowed to cool to room temperature.

The dyestuff is thereby precipitated, and is then filtered off, suspended in 2 parts of water, and subjected to reduction, for the purpose of reducing the nitro group to the amino group, by the addition of a solution of sodium disulfid (which may be conveniently made by dissolving in water about 6.5 parts of chip, sixty per cent. sodium sulfid and about 1.6 parts of sulfur, and filtering), and heating to 70° C. with agitation for about 2 hours, or until reduction is complete. The reduced dyestuff thus produced is separated by the addition of common salt to saturate the warm solution, and the precipitated dye is filtered off. Instead of using sodium disulfid for the reduction, sodium monosulfid or sodium polysulfid may be used.

The new dyestuff produced as described above, in the form of its sodium salt and in the dry and powdered state, is a greenish to brownish black powder soluble in water with a bluish violet color, and from such solution the addition of hydrochloric acid produces a reddish violet precipitate. It is slightly soluble in a ten per cent. solution of caustic soda. The dyestuff is soluble in alcohol with a reddish violet color, and is soluble in concentrated sulfuric acid with a bluish green color which solution upon dilution with ice-cold water produces a reddish violet precipitate.

The new dyestuff dyes vegetable and animal fibers, such as cotton, wool, silk, etc., as well as union fabrics composed of mixtures of these fibers, producing in general reddish blue shades which can be changed by diazotization and subsequent development upon the fiber or fabric with beta-naphthol, or meta-phenylenediamin, or meta-toluylenediamin, or resorcin, or the like, to give in general various shades of blue to black which differ from the self-shade in tint and in superior fastness.

The dyed materials produced either by the action of the dyestuff itself, or by developing the new dyestuff on the fiber or fabric, as well as the new dyestuff itself, form a part of the present invention.

I claim:
1. The herein described new disazo dye having in the form of its sodium salt the following probable formula:

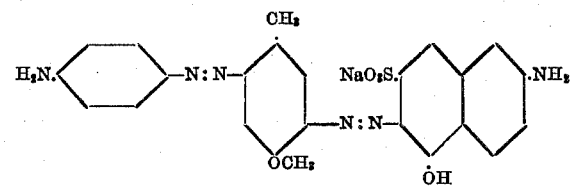

said dye, in the form of its sodium salt and in the dry and powdered state, being a greenish to brownish black powder soluble in water to give a greenish violet solution, soluble in alcohol with a reddish violet color, soluble in concentrated sulfuric acid with a bluish green color, and yielding upon reduction with stannous chlorid and hydrochloric acid p-phenylenediamin, diamino-p-cresol methyl ether, and diamino-1-naphthol-3-sulfonic acid; and dyeing cotton, wool, silk, and other fibers, or mixtures of the same, reddish blue shades which can be developed on the fiber to give various shades of blue to black.

2. The herein new dyes obtainable by diazotizing the new disazo dye of claim 1 and developing with a developing agent.

3. The herein new dye obtainable by diazotizing the new disazo of claim 1 and developing with m-toluylene-diamin.

4. Materials dyed with the new disazo dye of claim 1.

5. Union fabrics dyed with the new disazo dye of claim 1.

6. Materials dyed with the new disazo dye of claim 1, said dye being developed on the material.

7. Union fabrics dyed with the new disazo dye of claim 1, said dye being developed on the fabric.

8. Materials dyed with the new disazo dye of claim 1, said dye being developed on the material with m-toluylenediamin.

9. Union fabrics dyed with the new disazo dye of claim 1, said dye being developed on the fabric with m-toluylenediamin.

In testimony whereof I affix my signature.

THERESA M. SUSEMIHL.